United States Patent
Lay et al.

(10) Patent No.: US 6,862,293 B2
(45) Date of Patent: Mar. 1, 2005

(54) METHOD AND APPARATUS FOR PROVIDING OPTIMIZED HIGH SPEED LINK UTILIZATION

(75) Inventors: Samuel C. Lay, Superior, CO (US); Jeffrey J. Nelson, Louisville, CO (US)

(73) Assignee: McData Corporation, Broomfield, CO (US)

( * ) Notice: Subject to any disclaimer, the term of this patent is extended or adjusted under 35 U.S.C. 154(b) by 205 days.

(21) Appl. No.: 10/010,813

(22) Filed: Nov. 13, 2001

(65) Prior Publication Data

US 2003/0091062 A1 May 15, 2003

(51) Int. Cl.[7] .................... H04L 12/50; H04Q 11/00; H04J 3/02
(52) U.S. Cl. ................. 370/420; 370/360; 370/428; 370/463; 370/537
(58) Field of Search ................. 370/230, 238, 370/351, 352, 357, 359, 412, 413, 419, 428, 437, 461, 463, 465, 360, 401, 394, 396, 537, 535; 709/233, 249

(56) References Cited

U.S. PATENT DOCUMENTS

| | | | |
|---|---|---|---|
| 5,107,489 A | | 4/1992 | Brown et al. |
| 5,765,032 A | | 6/1998 | Valizadeh |
| 5,872,822 A | | 2/1999 | Bennett |
| 5,894,481 A | | 4/1999 | Book |
| 6,148,004 A | * | 11/2000 | Nelson et al. ............... 370/463 |
| 6,160,813 A | * | 12/2000 | Banks et al. ................. 370/422 |
| 6,185,203 B1 | * | 2/2001 | Berman ....................... 370/351 |
| 6,192,048 B1 | * | 2/2001 | Nelson et al. ............... 370/380 |
| 6,233,236 B1 | * | 5/2001 | Nelson et al. ............... 370/359 |
| 6,240,096 B1 | * | 5/2001 | Book ........................... 370/412 |
| 6,430,201 B1 | * | 8/2002 | Azizoglu et al. ........... 370/535 |
| 6,532,212 B1 | * | 3/2003 | Soloway et al. ............ 370/230 |
| 6,535,510 B2 | * | 3/2003 | Kalkunte et al. ........... 370/389 |
| 6,567,417 B2 | * | 5/2003 | Kalkunte et al. ........... 370/428 |
| 6,606,322 B2 | * | 8/2003 | Mitchem et al. ....... 370/395.31 |
| 6,697,359 B1 | * | 2/2004 | George ....................... 370/357 |

OTHER PUBLICATIONS

10 Gigibit Ethernet Alliance, "10 Gigabit Ethernet Technology Overview White Paper," Sep., 2001, Newport Beach, CA 92660.

* cited by examiner

Primary Examiner—Man U. Phan
(74) Attorney, Agent, or Firm—Baker Botts L.L.P.

(57) ABSTRACT

A method and apparatus for providing link aggregation and 10.2 gigabit per second throughput in a Fibre Channel fabric. One aspect of the present invention provides a port module for receiving a 10.2 gigabit link on a fiber interface and providing trunking of a plurality links on the backplane, wherein the backplane is coupled to a switching element. In addition, another aspect of the present invention provides a first port module coupled to a switching element for receiving a 10.2 gigabit link from a fabric on a fiber interface and thereafter transmitting fiber channel frames to a second port module coupled to the switching element that interfaces to the fabric at 10.2 gigabits, thereby providing 10.2 gigabit to 10.2 gigabit throughput from the first port module to the second port module.

22 Claims, 6 Drawing Sheets

METHOD AND APPARATUS FOR PROVIDING OPTIMIZED HIGH SPEED LINK UTILIZATION

BACKGROUND OF THE INVENTION

The present invention relates, in general, to the field of Fibre Channel switching technology. More particularly, the present invention relates to a port module that is adapted to receive a 10 gigabit-per-second fiber link for use in a Fibre Channel switching environment.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre Channel employs a topology known as a "fabric" to establish connections between nodes. A fabric is a network of switches for interconnecting a plurality of devices without restriction as to the manner in which the switch can be arranged. A fabric can include a mixture of point-to-point and arbitrated loop topologies.

In Fibre Channel, a channel is established between two nodes where the channel's primary task is to transport data from one point to another at high speed with low latency. The Fibre Channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

The basic element of a fabric is a switch. In a fibre channel system, data is transported in frames, where each frame has a header identifying, among other things, a destination node. The destination identification is referred to as a "DID". A switch comprises a plurality of ports that transmit and receive data frames from an external link. The port is implemented by circuitry that receives data from the external link, buffers data as needed, and preferably performs some analysis to ensure integrity of the received data and use header information, such as the DID to process the received frame within the switch.

A switch also includes mechanism such as a crossbar matrix or the like to internally couple each port on the switch to another port on the switch so that frames received on one port (e.g., a receive or RX port) can be communicated to another port (e.g., a transmit or TX port). A switch also includes data processing mechanisms for analyzing the received frame to determine the appropriate TX port that will reach the node specified by the frame's DID. In any given switch, the port electronics have a maximum data rate determined by the hardware components. Typically the port electronics will support data rates lower than the maximum data rate, but not higher.

As Fibre Channel technology advances, an increase in the data transmission speed of the Fibre Channel links becomes increasingly desirable. However, in many cases, the existing hardware is incompatible with advances in the overall speed of the network. As a result, it becomes necessary to either replace the existing hardware, a costly alternative, or gradually transition to the new technology utilizing add-ons that operate to merge new technology and existing technology. If properly configured, add-ons, such as plug-in adapters or the like, allow combinations of current architecture and technological advances with only incremental modifications.

Currently, universal port modules provide a 1 Gb/s and a 2 Gb/s data rate for Fibre Channel switching systems. However, a new Fibre Channel standard exists that discloses an increase to a 10 Gb/s data rate. Most existing architectures are not designed to handle and effectively utilize the increase in data rate without significant modifications and upgrades to hardware components since most systems are designed to handle lower than a maximum data rate but not a higher than a maximum data rate. Hence, there is a need for a port module for use with existing Fibre Channel switching architecture that is capable of utilizing a 10 Gb/s data rate in accordance with the Fibre Channel standard.

SUMMARY OF THE INVENTION

The Fibre Channel port module design of the present invention provides a solution that enables existing hardware to support a data rate increase to ten gigabits per second or higher, and it does so in an extremely efficient manner without requiring significant design changes and with only a relatively straightforward alteration to existing Fibre Channel switching environments. The present invention provides a port module for use in a Fibre Channel switching environment. More particularly, the port module of one aspect of the invention provides using a single ten gigabit per second port to provide higher utilization for multiple lower speed ports. The port module couples to the existing ports of a switching device, such as a crossbar switch in a Fibre Channel fabric, and provides an ANSI 10GFC compliant fibre interface to the port module and support for trunking on the backplane of the port module. In doing so, the invention reuses existing product infrastructure and customer investment to increase overall data throughput.

Particularly disclosed herein is a Fibre Channel port module having a fibre data interface that is adapted to couple to a 10.2 gigabit per second link. The module also has a front end coupled to the fibre data interface for transmitting and receiving Fibre Channel data to and from the fibre data interface. The module provides a route controller coupled to the front end for route processing of the Fibre Channel data. Route processing determines one or more destination ports on a switching element for the Fibre Channel data. The port module has a backplane data interface operative for coupling to a plurality of ports on a switching element.

In another aspect, the present invention provides a method of providing 10.2 gigabits per second throughput from a first port to a second port. The first port receives Fibre Channel data having a first fibre data interface configured for interfacing to a 10.2 gigabit-per-second link and a first backplane data interface having a plurality of port module ports. The port module determines that the Fibre Channel data is destined for a second port that has a second fibre data interface configured for interfacing to a 10.2 gigabit-per-second link and a second backplane data interface having a plurality of port module ports. The plurality of port module ports of said first port are coupled to a first and second switching element using a first plurality of links, wherein said first plurality of links are aggregated to provide a data rate of up to 10.2 gigabits per second. The plurality of port module ports of said second port are coupled to a first and second switching element using a second plurality of links, wherein said second plurality of links are aggregated to provide a data rate of up to 10.2 gigabits per second. Fibre Channel data is then routed from the first port to the second port.

Still further disclosed herein is a method of providing link aggregation at a port. The port comprises a port module having a fibre data interface and a backplane data interface. The fibre data interface is configured for receiving a 10.2 gigabit-per-second link. The backplane data interface is configured for coupling a plurality of port module ports to at least one Fibre Channel switch. The fibre data interface is coupled to a 10.2 gigabit-per-second link. The plurality of port modules are coupled to a plurality of ports on at least one switching element using a plurality of backplane links. Fibre Channel data is then received at the first port. Fibre Channel data is determined as destined for a second port. The Fibre Channel data is routed from the first port to the second port over the plurality of backplane links.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
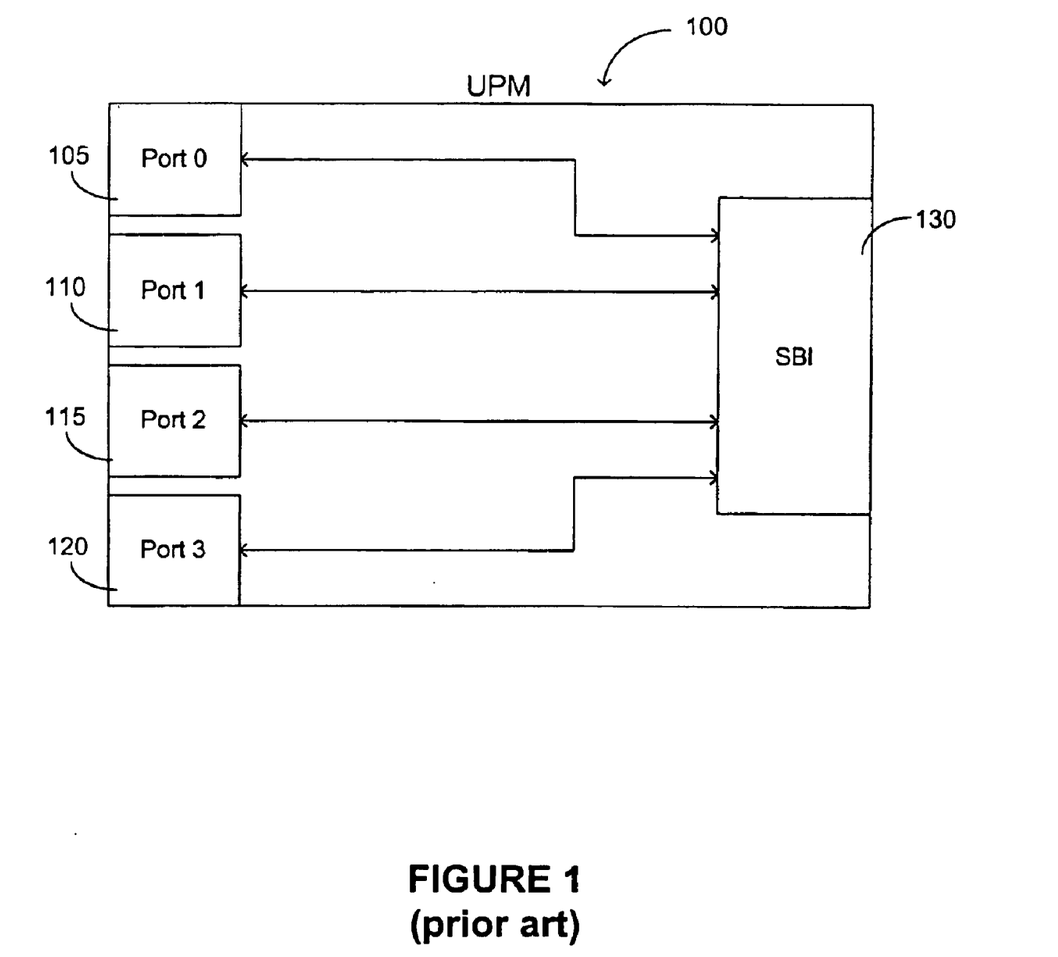
FIG. 1 is a block diagram of a prior art fibre universal port module for use with a Fibre Channel switching element.

FIG. 1 (Prior Art) illustrates a typical 1 gigabit-per-second (i.e., 1.0625 gigabits per second) or 2 gigabit-per-second (i.e., 2.125 gigabits per second) universal port module 100. More particularly, universal port module 100 has four G-ports 105, 110, 115 and 120 for receiving Fibre Channel data or frames from a fabric. Fibre port module 100 also has an Sbar interface (SBI) 130 for coupling to a switching element (not shown). SBI 130 has a link for each port, in essence four links for ports 105, 110, 115 and 120, that operate independently. In operation, a frame appears at one of the ports, for example port 105. The frame is transmitted from port 105 to a link coupled to SBI 130. SBI 130 transmits the frame to the switching element over one of the links coupled to port 105.

Figure 2:
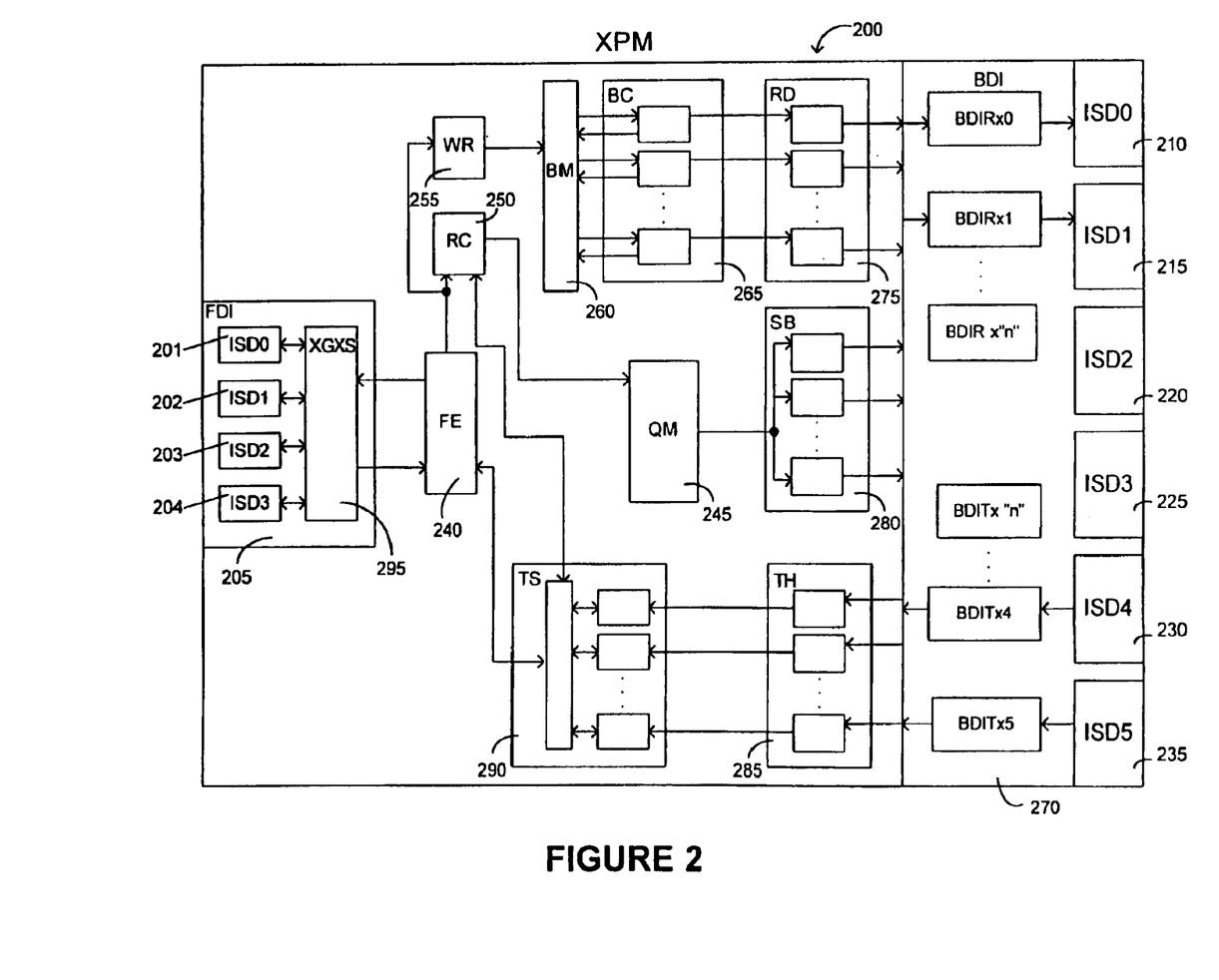
FIG. 2 is a block diagram of a ten gigabit per second port module for use with a Fibre Channel switching element.

FIG. 2 illustrates one embodiment of a ten gigabit port module 200 in accordance with the present invention. Port module 200 is a ten gigabit Fibre Channel compliant G-Port that preferably also supports F_Port or E_Port functionality. Port module 200 supports 10.2 gigabits per second optics on the Fibre side (generally on the left side in FIG. 2) and a plurality of 1.0625 or 2.125 gigabits per second data transfer rate lanes through backplane data interface 270. Fibre port module 200 also has a plurality of integrated serializer/deserializer(ISD) cores 210, 215, 220, 225, 230 and 235 to interface to a switching element (not shown) on the backplane side (generally on the right side of FIG. 2). Port module 200 comprises at least one 10 gigabit Fibre Channel Fibre Data Interface 205 as well as four or six backplane data and control interfaces for receiving and transmitting data to and from an internal switching element. The backplane data and control interfaces operate independent of each other.

Port module 200 is configurable on the backplane as a four port trunk group (up to 4×2.125=8.5 gigabits per second) or a six port trunk group using frame striping (6×2.125=12.75 gigabits per second for an effective 10.2G data rate). Trunking is defined herein as combining or aggregating bandwidth through the use of multiple connections simultaneously. Frame striping is described in patent application Ser. No. 09/809,996, entitled "Method for Aggregating A Plurality of Links to Simulate a Unitary Connection" filed Mar. 14, 2001, which is hereby incorporated in the present application for all purposes. Traffic flows over the multiple connections simultaneously and together they provide higher bandwidth using lower speed technology. Trunking allows port module 200 to receive data frames at a 1 or 2 gigabits per second data rate from backplane links coupled to ISD's 210, 215, 220, 225, 230 and 235.

Fibre data interface (FDI) 205 is the interface between front end 240 and a ten gigabit per second Fibre Channel data link. In one embodiment, FDI 205 is coupled to an off chip XAUI module. A XAUI module is a ten gigabit attachment unit interface that is specified in the IEEE802.3ae 10G Ethernet specification. The module comprises four lanes of byte striped data each running at 3.125 gigabits per second. In the ANSI 10GFC specification, each lane runs 2% higher(3.1875 Gb/s) to achieve 10.2 gigabits per second data throughput.

More generally, the XAUI functions can be implemented by circuitry provided external to port module 200 or integrated internally within port module 200. The XAUI standard is an example of a particular implementation, but any implementation that performs byte striping to divide a single high data rate frame and spread it across plural lower data rate data lanes is a suitable equivalent. Hence, a generic implementation functions to present plural striped data lanes to FDI 205.

Preferably, the byte striping implements a protocol that includes mechanisms such as defined characters to assist with lane de-skew, data alignment and clock recovery functions. In this manner, each data lane includes sufficient information to maintain the integrity of a striped frame so that the frame can be reconstructed at some point in the future. A significant feature of the present invention involves methods and systems for switching the plural data lanes in a coordinated fashion through hardware that is typically configured to switch each of the lower data rate lanes independently.

FDI 205 has four ISD's 201, 202, 203 and 204 and one extender sublayer (XGXS) block 295 that performs a data decode/encode function as well as status and control register specific to the four ISD's and XGXS block 295. In one embodiment of port module 200 employing a XAUI module, each Fibre side ISD 201, 202, 203 and 204 operates at 3.1875 gigabits per second to support a XAUI interface at Fibre Channel data rates. Four ISD's operate together to provide 4×3.1875 gigabits per second throughput to the XGXS decoder block 295 contained within FDI 205. In one embodiment, XGXS block 295 has register interfaces for functions contained in each of the ISD modules such as programmable driver levels and pre-emphasis settings.

XGXS block 295 receives data from the four ISD's 201, 202, 203 and 204 and performs lane deskew and alignment and 8B/10B decode. XGXS block 295 then outputs four bytes of data. The data received from block 295 is four lanes of octet data at 318.75 Mhz for a 10.2 Gb/s data rate. XGXS block 295 also encodes each lane 8B/10B data that is provided for transmission by front end 240 at 318.75 Mhz. Since deskew and alignment is performed on the receive side, each transmit lane operates independently.

Front end (FE) 240 manages reception and transmission of Fibre Channel FC1 and FC2 compliant data to/from integrated FDI block 205. More particularly, FE 240 receives byte striped fibre channel frames from FDI 205 in four lanes. FE 240 reassembles the four lanes into data words and thereafter performs a Fibre Channel protocol validation operation conforming to the 10GFC specification for link sequencing and control as well as framing protocol.

Route controller (RC) 250 interfaces to FE 240 and provides received frame processing, including destination port determination, address validation and route validation. RC 250 monitors the FE interface 240 for any newly received frames and extracts information to make a decision as to how the frame should be routed, such as destination identification (DID) or source identification (SID) information. In one embodiment, route controller 250 handles 240 tables×256 ports/table, which allows full fabric lookup. RC 250 contains fields in tables to accommodate the ability to determine that an incoming DID is destined for a 10 gigabit per second port. RC block 250 has bits in the route tables for each entry that indicates to downstream logic, such as queue manager (QM) 245, that an incoming D_ID is destined for a 10 gigabit per second port.

Frame writer (WR) 255 interfaces to FE 240 and receives data from FE 240 and properly formats the data prior to writing onto buffer memory 260. In the illustrated example, WR 255 maintains a list of up to 250 free buffers and their status. In the illustrated example, frame writer 255 supports up to 10.2 gigabits per second of data throughput.

Buffer memory 260 provides a minimum throughput of 20.4 gigabits per second. Therefore, buffer memory can handle one write operation at 10.2 gigabits per second and six simultaneous read operations at 1.7 gigabits per second. In a particular embodiment, buffer memory 260 also supports 250 buffers that each can support a full length Fibre Channel frame of 2148 bytes. Each word of data written to buffer memory 260 preferably has parity protection.

Port module 200 comprises a buffer memory controller 265 coupled to buffer memory 260. Buffer memory controller (BC) 265 controls the buffer memory elements. Buffer memory controller 265 supports a simultaneous transfer of data out of all six frame reader (RD) blocks 275 at the same time, each effectively operating independently. Buffer memory controller 265 also supports the ability to simultaneously write data into the BM at a 10.2 gigabits per second data rate as fed by the frame writer module 255 and is designed to allow any BC 265 to access any buffer in the 250 buffers in buffer memory 260. FIG. 2 depicts one implementation that allows one frame to be written and six data frames to be read from buffer memory 260 at the same time resulting in a 20.4 gigabits per second bandwidth through the port.

Queue manager (QM) 245 is the central core of port module 200. QM 245 is responsible for building queues of received frames for destination ports from information received from frame writer 255 and route controller 250. Queue manager 245 also interfaces to a switching device through Sbar controller (SB) 280 to establish connections as both a source and a destination. QM 245 utilizes reader 275 and Sbar control interfaces 280 independently. QM 245 supports destination port based queuing and Virtual Output Queueing (VOQ). Virtual Output Queueing is a method by which individual queues are created and maintained at the source port for each destination port. This method avoids the typical head of queue blocking issues associated with pure source port queues and the high bandwidth requirements associated with destination queuing. QM 245 also has an additional 1 bit to be stored in memory that comes from route controller 250 that signifies the D_ID is a 10 gigabit port. QM 245 indicates to SB 280 to initiate a connection request, then passes this bit to SB block 280 on a signal.

Port module 200 comprises a frame reader block 275. Frame reader block is responsible for reading stored frames from buffer memory 260 and transferring them to an external switching element coupled to backplane data interface 270. QM 245 passes frame header word information, buffer to access and the switching element path to use to frame reader 275. Frame reader 275 creates and transmits the header word immediately followed by frame data on the selected switching element path. Port module also has an associated transmit handler 285. Transmit handler (TH) 285 provides the interface for transmission of frames at the port.

Transmit scheduler block (TS) 290 of port module 200 is responsible for scheduling frame transfers and passing the frame data to FE 240. Block 290 is inserted between TH 285 and FE 240 on the transmit side of the TH ports. TS 290 manages the configured ports busy bits and frame transmission conforming to the 10 gigabit (10G) requirements. TS 290 has four or six additional buffers, each capable of storing a full frame. TS block 290 and TH block 285 are capable of receiving both 1 and 2 gigabits per second frames. TS 290 queries the status of FE 240 and, if not busy, begins transferring data out to FE 240. TS block 290 operates to ensure in order delivery of frames.

SBAR control interface (SB) 280 of port module 200 supports 10G for request/response operations. SB 280 processes requests for each of the six channels or lanes of the backplane data interface 270 independently. When connecting to a destination identification (DID) that is determined to be a 10G destination port, SB 280 cycles through each of the associated DID addresses based the additional bit passed from QM 245 indicating that the DID is a 10G destination port. SB cycles through each address one time or until establishing a connection, which ever occurs first. SB 280 contain a bus that returns to QM 245 for indicating the identity of the D_ID it was connected as source when attempting to connect to the 10G destination port.

Queue manager 245 monitors the status of the six backplane resources (SB 280 and RD 275) and utilizes the next available resource to request a connection, so long as the frame is not bound for the same destination as a currently pending request on another channel. QM 245 operates on destination port based queuing to ensure frames are sent in order. In the case that a DID is a 10G port, SB 280 is notified by QM 245 when requesting a connection operation to be encoded. The DID passed from QM 245 will always be the first port in this 10G port along with the signal indicating to SB 280 to cycle through each of the DID's until getting a connected as source back or all busy responses. When a connected as source response is received and the DID is part of a 10G port, SB 280 passes back the DID of the port having the connection. QM 245 inserts the DID value in the header using RD 275. The frame is sent out and RD 275 indicates completion status. QM 245 may then submit another connection request operation.

Backplane data interface (BDI) module 270 comprises associated buffering and re-timing logic required to interface to the integrated ISD modules 210, 215, 220, 225, 230 and 235. Each port operates independently, and has one separate ISD module, a backplane data interface transmitter (BDITX"n") block and backplane data interface receiver (BDIRX"n") block. Both the BDITX and BDIRX blocks have register interfaces for functions contained in each of the ISD modules, such as programmable driver levels and pre emphasis settings. In port module 200, each backplane side ISD 210, 215, 220, 225, 230 and 235 operates at a data rate up to 2.5 gigabits per second. The BDIRX"n" block in BDI 270 manages 8B/10B decoding operations and primitive character detection. This module will provide indications of character synchronization and receiver reset control. The BDITX"n" block in BDI 270 manages 8B/10B encoding operations and interfacing to the ISD module.

Figure 3:
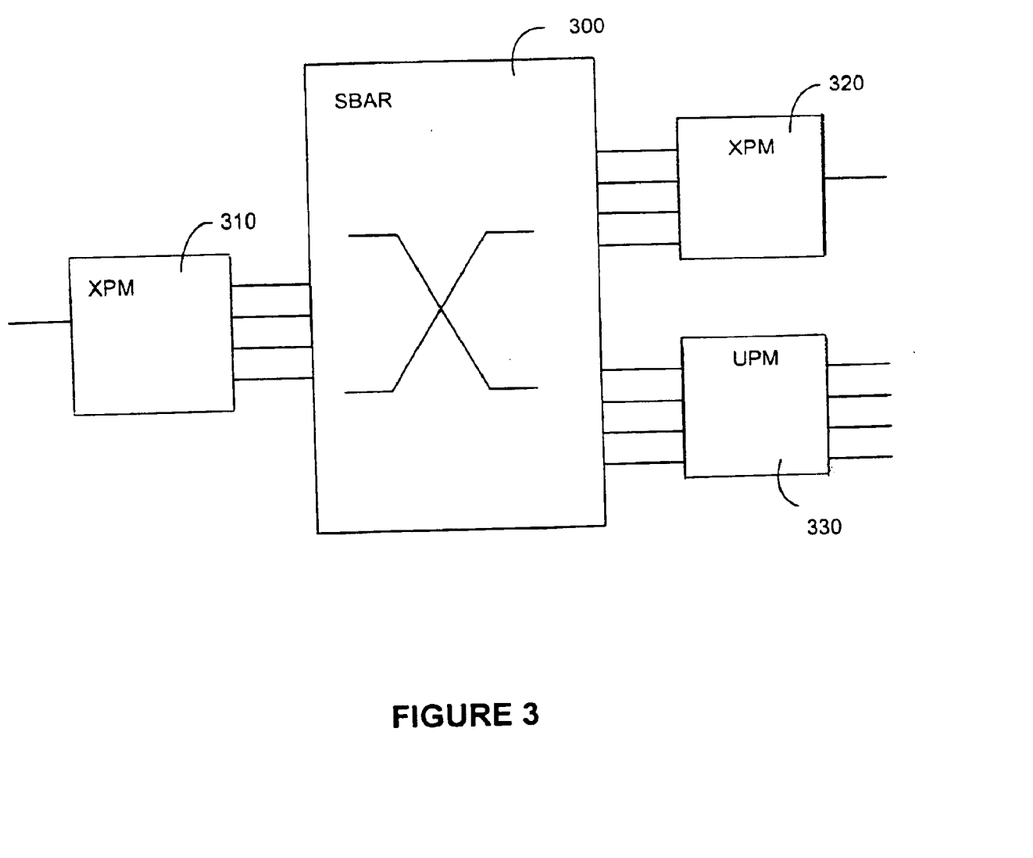
FIG. 3 is a block diagram illustrating the interconnection of a ten gigabit per second port module and a universal port module and a switching element.

FIG. 3 illustrates a typical fabric configuration having a mixture of ten gigabit port modules (XPM's) 310 and 320 and a universal port module (UPM) 330 coupled to an SBAR 300. SBAR 300 is a serial crossbar switch, or switching element, that provides switching paths between all ports. The configuration of FIG. 3 illustrates link aggregation on the backplane of XPM 310 and XPM 320. XPM 310 receives data at a data rate of 10.2 gigabits per second and thereafter transmits the data out either XPM 320 at a data rate less than 10.2 gigabits per second or UPM 330 at a data rate of 1 or 2 gigabits per second.

In one embodiment, the fibre channel input to XPM 310 in FIG. 3 is a 10 Gb/s link and the input to UPM 330 is either a 1 Gb/s link or a 2 Gb/s link. Fibre channel frames may originate at either the 1 Gb/s link or 2 Gb/s link coupled to UPM 330 destined for the 10 Gb/s link coupled to XPM 310. Similarly, fibre channel frames may originate at the 10 Gb/s link coupled to XPM 310 destined for either the 1 Gb/s link or 2 Gb/s link coupled to UPM 330. The configuration of the port modules in FIG. 3 allows for a 10G to 1G or 2G data transfer from XPM 310 to UPM 330, or a 1G or 2G to 10G data transfer from UPM 330 to XPM 310.

Figure 4:
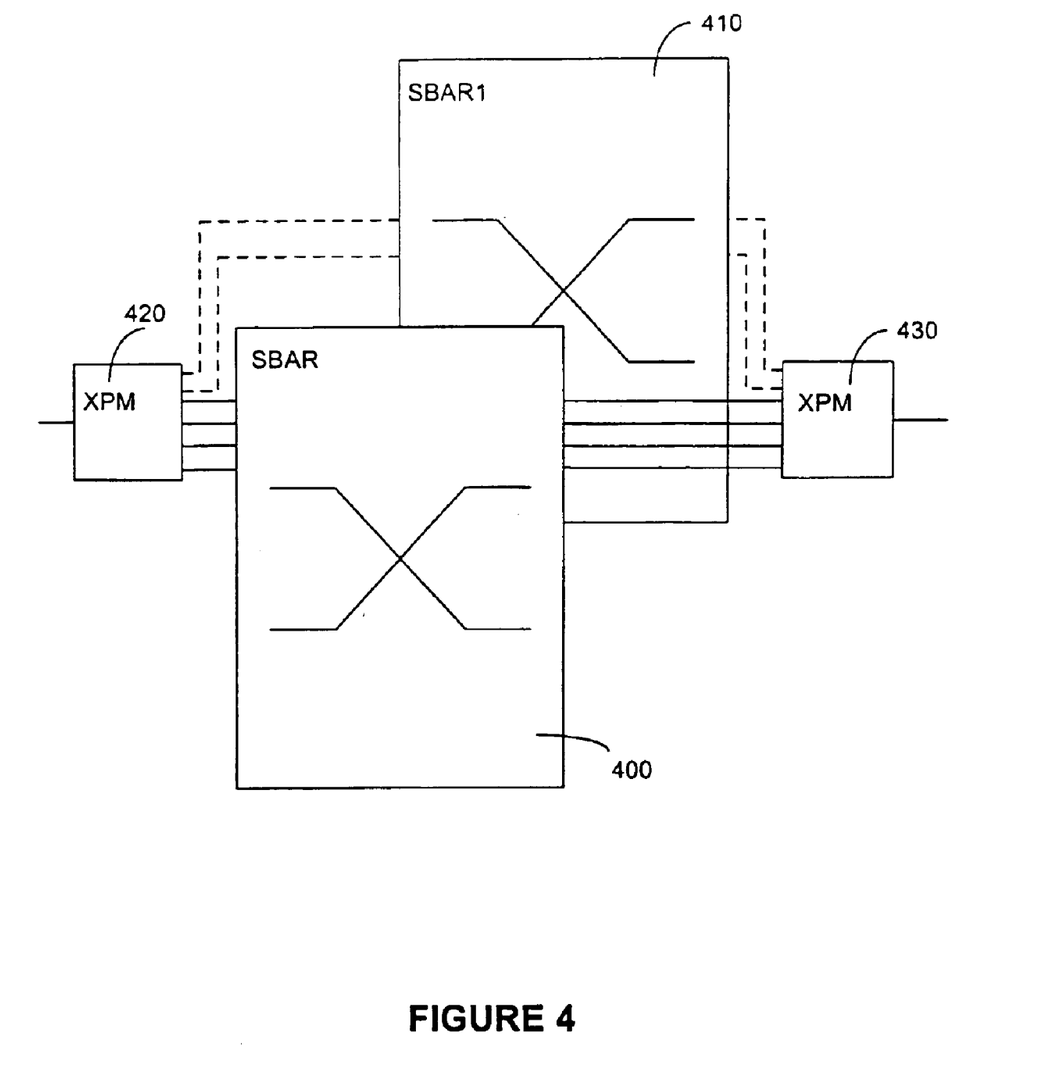
FIG. 4 is a block diagram illustrating two switching elements and two ten gigabit per second port modules to achieve a ten gigabit per second to ten gigabit per second throughput.

FIG. 4 illustrates a typical fabric configuration having two ten gigabit port modules (XPM's) 420 and 430 coupled to SBAR0 400 and SBAR1 410. The configuration of FIG. 4 illustrates 10.2 gigabit to 10.2 gigabit throughput from a first port module XPM 420 to a second port module XPM 430.

For example, a Fibre Channel frame arrives on a 10.2 gigabit link coupled to XPM 420. As stated previously, the 10.2 gigabit link is a four lane input to XPM 420, wherein each lane operates at 3.1875 for a total data rate of 12.75 Gb/s for a 10B encoded data rate. According to the 10GFC standard, the 12.75 gigabit data rate under 10B mode equates to a 10.2 gigabit rate in 8B mode. XPM 420 determines the frame is destined for a second 10.2 gigabit link coupled to XPM 430. Due to current design limitations, a maximum of four physical links operating at a 2.125 Gb/s data rate may couple SBAR0 to both port module 420 and port module 430. Such a design limitation prohibits 10.2 Gb/s to 10.2 Gb/s throughput.

The addition of a second or redundant SBAR, SBAR1 410, provides 10.2 Gb/s to 10.2 Gb/s throughput from XPM 420 to XPM 430. The addition of two additional physical links operating at 2.125 Gb/s coupling XPM 420 to SBAR1 410 and XPM 430 to SBAR1 410 in addition to frame striping among the six links, results in a 6×2.125 Gb/s data rate, which equates to a 10.2 Gb/s data rate with 8B/10B decoding/encoding.

Figure 5:
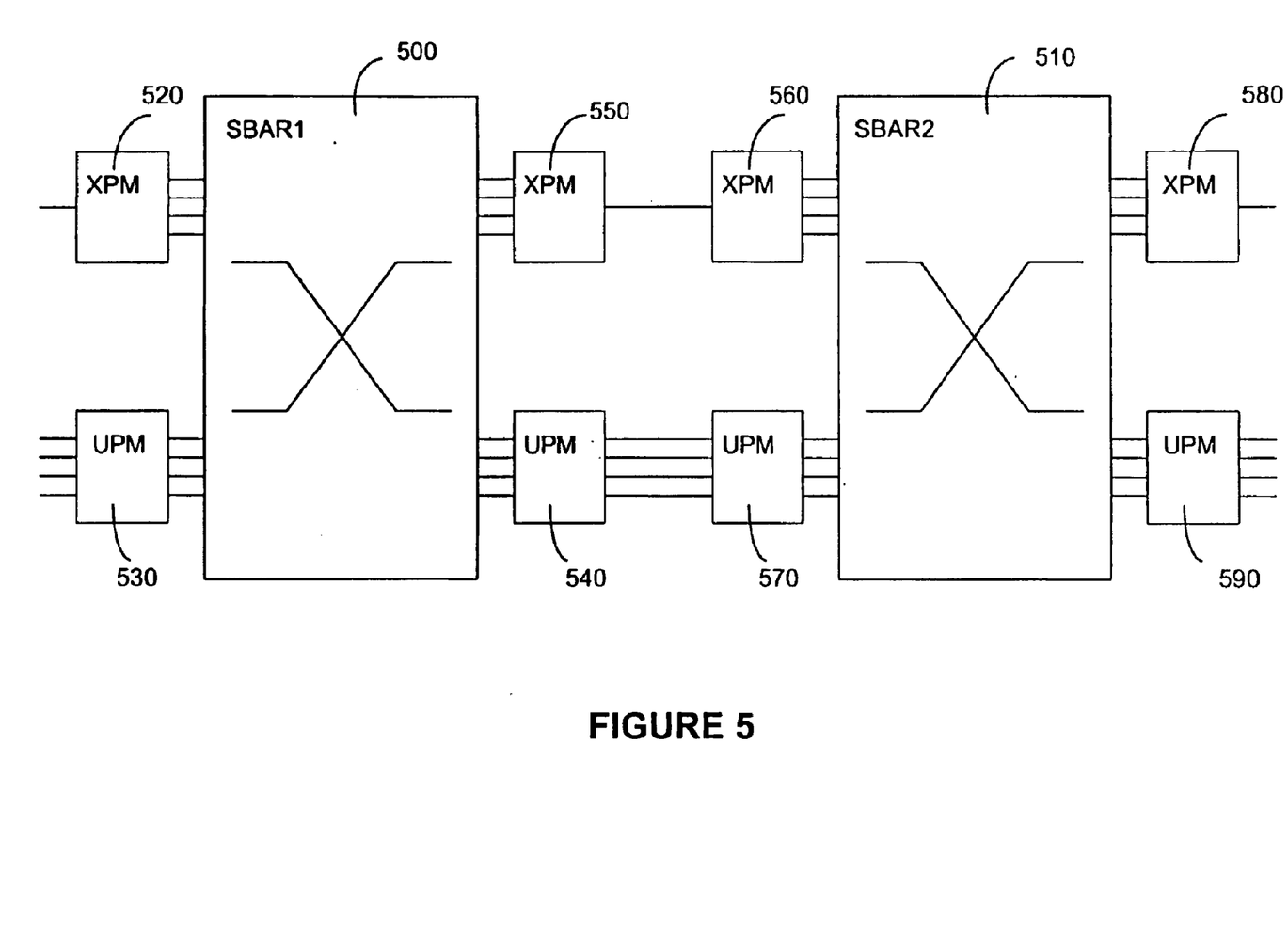
FIG. 5 is a block diagram showing a Fibre Channel fabric with various port module plug-in cards connecting to various ports of a plurality of switching elements.

FIG. 5 illustrates a Fibre Channel fabric having a plurality of ten gigabit port modules (XPM's) 520, 550, 560 and 580 and a plurality of universal port modules (UPM's) 530, 540, 570 and 590 coupled to SBAR1 500 and SBAR2 510. As illustrated, the use of XPM's minimize the wiring between switches since only a single physical connection is required for four ports on an SBAR instead of four physical connection for four ports on an SBAR using the UPM's. Reducing the number of physical links is a desirable cable management aspect of the present invention.

Figure 6:
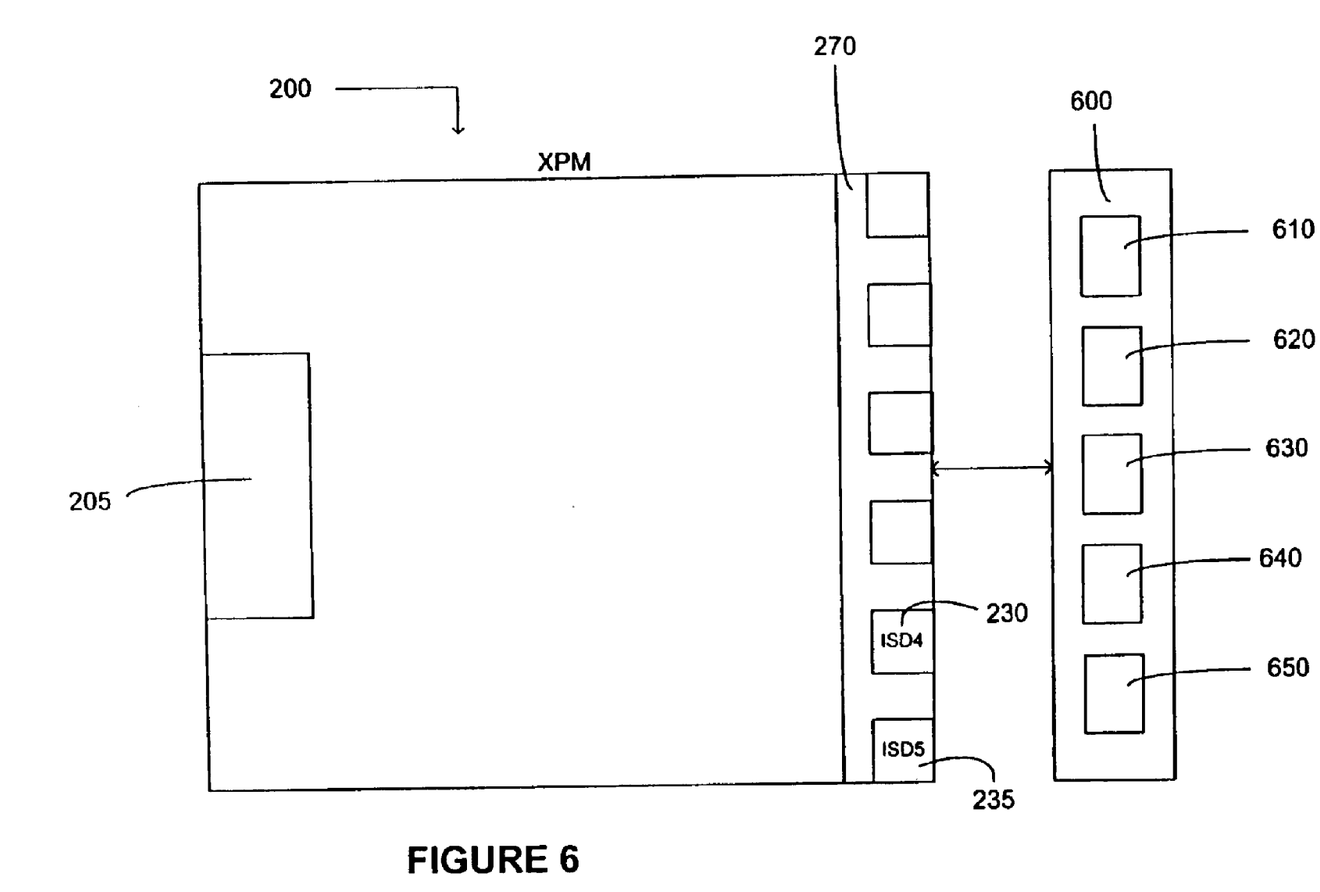
FIG. 6 illustrated both a "basic switching" configuration and an "expanded switching" configuration in accordance with the present invention.

FIG. 6 illustrates both a "basic switching" configuration and an "expanded switching" configuration in accordance with the present invention. SBAR element 600 consists of 5 crosspoint switch components 610, 620, 630, 640 and 650 that each switch 128×128 ports. Coupling four of the crosspoint switch components 610, 620, 640 and 650 (also referred to as the active crosspoint switch components) to XPM 200 achieves 256×256 switching, which is defined herein as basic switching configuration.

The fifth crosspoint switch component 630 is redundant, and can be used to replace one of the four active crosspoint switch components if a failure is detected in the basic switching configuration. When not in use, the spare crosspoint switch component 630 may be used to increase bandwidth, which is defined herein as expanded switching. The additional backplane channels of XPM 200, ISD4 230 and ISD5 235 are active when the spare crosspoint switch component 630 is not being used as part of the basic switching configuration.

When crosspoint switch components 610, 620, 640 and 650 and spare crosspoint switch component 630 are fully operational, XPM 200 may support a full 6×2.125 Gb/s throughput or expanded switching mode. Channels ISD4 230 and ISD5 235 couple to another 10G destination port within the switch. When spare crosspoint switch component 630 is engaged to become active in the basic switching crosspoint system, channels ISD4 230 and ISD5 235 are unavailable for use by the backplane channels. All traffic, whether destined for a 1 gigabit, 2 gigabit or 10 gigabit port would use channels ISD0 210, ISD1 215, ISD2 220 and ISD3 225.

While there have been described above the principles of the present invention in conjunction with a specific embodiment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A fibre channel port module comprising:

a fibre data interface, configured to couple to a 10.2 gigabit per second link, for receiving byte striped fibre channel frames;

a front end coupled to said fibre data interface for transmitting and receiving byte striped fibre channel frames to and from said fibre data interface;

a route controller coupled to said front end for route processing of said fibre channel frames, wherein said route processing comprises determining a destination port on a switching element for said fibre channel frames; and a backplane data interface operative for coupling to a plurality of ports on a switching element.

2. The fibre channel port module of claim 1 wherein said fibre data interface further comprises a plurality of fibre side integrated serializer/deserializer (ISD) modules coupled to an extender sublayer using a plurality of lanes, wherein said sublayer receives data from said fiber side ISD modules and performs lane deskew and alignment and 8B/10B decode.

3. A fibre channel port module comprising:

a fibre data interface, configured to couple to a 10.2 gigabit per second link, for receiving byte striped fibre channel frames;

a front end coupled to said fibre data interface for transmitting and receiving byte striped fibre channel frames to and from said fibre data interface;

a route controller coupled to said front end for route processing of said fibre channel frames, wherein said route processing comprises determining a destination port on a switching element for said fibre channel frames;

a backplane data interface operative for coupling to a plurality of ports on a switching element;

a plurality of fibre side integrated serializer/deserializer (ISD) modules coupled to an extender sublayer using a plurality of lanes, wherein said sublayer receives data from said fiber side ISD modules and performs lane deskew and alignment and 8B/10B decode; and wherein said data output from said sublayer comprises four lanes of octet data at 318.75 Mhz.

4. A fibre channel port module comprising:

a fibre data interface, configured to couple to a 10.2 gigabit per second link, for receiving byte striped fibre channel frames;

a front end coupled to said fibre data interface for transmitting and receiving byte striped fibre channel frames to and from said fibre data interface;

a route controller coupled to said front end for route processing of said fibre channel frames, wherein said route processing comprises determining a destination port on a switching element for said fibre channel frames;

a backplane data interface operative for coupling to a plurality of ports on a switching element;

a plurality of fibre side integrated serializer/deserializer (ISD) modules coupled to an extender sublayer using a plurality of lanes, wherein said sublayer receives data from said fiber side ISD modules and performs lane deskew and alignment and 8B/10B decode; and wherein said plurality of ISD modules comprise four ISD modules each operating at a data rate of up to 3.1875 gigabits per second.

5. The fibre channel port module of claim 1 further comprising a ten gigabit attachment unit interface (XAUI) module coupled to said fibre channel data interface, wherein said XAUI module is configured for byte striping fibre channel frames.

6. The fibre channel port module of claim 1 wherein said backplane data interface comprises a plurality of port module ports, wherein each port module port comprises a backplane integrated serializer/deserializer (ISD) module, a backplane data interface receiver and a backplane data interface transmitter, wherein each backplane ISD module is configured for coupling to a first port on said switching element.

7. The fibre channel port module of claim 6 wherein said backplane data interface receiver is configured for providing 8B/10B decoding and said backplane data interface transmitter is configured for providing 8B/10B encoding.

8. A fibre channel port module comprising:

a fibre data interface, configured to couple to a 10.2 gigabit per second link, for receiving byte striped fibre channel frames;

a front end coupled to said fibre data interface for transmitting and receiving byte striped fibre channel frames to and from said fibre data interface;

a route controller coupled to said front end for route processing of said fibre channel frames, wherein said route processing comprises determining a destination port on a switching element for said fibre channel frames;

a backplane data interface operative for coupling to a plurality of ports on a switching element buffer memory having a plurality of buffers for storing a fibre channel frame, said buffer memory configured to handle a throughput at a data rate of 20.4 gigabits per second;

a frame writer coupled to said front end for storing fibre channel data in said buffer memory, said frame writer configured to handle a throughput at a data rate of 10.2 gigabits per second;

a queue manager coupled to said buffer controller and said route controller, said queue manager configured to receive messages from said route controller and dynamically build queue entries for each destination port determined by said route controller; and a buffer controller coupled to said buffer memory, said buffer controller is configured to write data to and read data from memory at a data rate of 10.2 gigabits per second.

9. The fibre channel port module of claim 8 wherein said buffer memory is configured to handle a 10.2 gigabits per second write and six simultaneous 1.7 gigabits per second reads.

10. The fibre channel port module of claim 1 wherein said route controller is configured to determine that a destination identification of a fibre channel frame is a 10.2 gigabit port.

11. The fibre channel port module of claim 1 wherein said front end is further adapted for performing a fibre channel protocol validation on reassembled fibre channel frames from the byte striped fibre channel frames.

12. A fibre channel fabric comprising:

a first switching element having a plurality of switch ports;

a first fibre channel port module comprising:

a fibre data interface, configured for interfacing to a 10.2 gigabit-per-second link, for receiving byte striped fibre channel frames;

a front end coupled to said fibre data interface for transmitting and receiving byte striped fibre channel frames to and from said fibre data interface and for reassembling byte striped data received from the fibre data interface; and a backplane data interface having a plurality of port module ports; and a plurality of links coupling said switch ports to said port module ports.

13. A fibre channel fabric comprising:

a first switching element having a plurality of switch ports;

a first fibre channel port module comprising:

a fibre data interface, configured for interfacing to a 10.2 gigabit-per-second link, for receiving byte striped fibre channel frames;

a front end coupled to said fibre data interface for transmitting and receiving byte striped fibre channel frames to and from said fibre data interface and for reassembling byte striped data received from the fibre data interface; and a backplane data interface having a plurality of port module ports; and a plurality of links coupling said switch ports to said port module ports, wherein said plurality of links comprises four links coupling the plurality of port modules of said backplane data interface to the switch ports of said first switching element.

14. The fibre channel fabric of claim 13 wherein said plurality of links operate at a data rate of 1.0625 gigabits per second and/or 2.125 gigabits per second.

15. The fibre channel fabric of claim 13 comprising a second switching element having a plurality of switch ports, wherein the switch ports of said second switching element are coupled to the plurality of port module ports of said backplane data interface of said fibre channel port module, wherein said fibre channel fabric provides a 10.2 gigabit per second throughput.

16. The fibre channel fabric of claim 15 further comprising a second fibre channel port module comprising:

a fibre data interface, configured for interfacing to a 10.2 gigabit-per-second link, for receiving byte striped fibre channel frames;

a front end coupled to said fibre data interface for transmitting and receiving byte striped fibre channel frames to and from said fibre data interface and for reassembling byte striped data received from the fibre data interface; and a backplane data interface having a plurality of port module ports, wherein said second fibre channel port module is coupled from the port module ports to the switch ports of said first and second switching elements by a plurality of links.

17. A method of providing 10.2 gigabits per second throughput from a first port module to a second port module, comprising:

receiving fibre channel data at said first port module comprising a first fibre data interface configured for interfacing to a 10.2 gigabit-per-second link and a first backplane data interface having a plurality of port module ports;

determining said fibre channel data is destined for said second port module comprising a second fibre data interface configured for interfacing to a 10.2 gigabit-per-second link and a second backplane data interface having a plurality of port module ports;

coupling said plurality of port module ports of said first port module to a first and second switching element using a first plurality of links, wherein frame striping on said first plurality of links provides a data rate of up to 10.2 gigabits per second;

coupling said plurality of port module ports of said second port module to a first and second switching element using a second plurality of links, wherein frame striping on said second plurality of links provides a data rate of up to 10.2 gigabits per second;

routing said fibre channel data from said first port module to said second port module.

18. A method of providing link aggregation at a first port comprising a port module having a fibre data interface and a backplane data interface, wherein said fibre data interface is configured for coupling to a 10.2 gigabit-per-second link and receiving byte striped fibre channel frames and said backplane data interface is configured for coupling a plurality of port module ports to at least one fibre channel switch, said method comprising:

coupling said fibre data interface to a 10.2 gigabit-per-second link;

coupling said plurality of port module ports to a plurality of switch ports on said at least one switching element using a plurality of backplane links, wherein said plurality of backplane links comprise a plurality of 2.125 gigabit-per-second links;

receiving byte striped fibre channel frames at said first port;

reassembling the byte striped fibre channel frames in the first port;

determining said fibre channel frames are destined for a second port; and routing said fibre channel frames from said first port to said second port over said plurality of backplane links.

19. The method according to claim 18 wherein said second port comprises a 1.0625 gigabit-per-second port and/or a 2.125 gigabit-per-second port.

20. The method of claim 18 wherein said plurality of backplane links are aggregated such that fibre channel data flows over said plurality of backplane links simultaneously thereby providing higher bandwidth together than each link provides individually.

21. A fibre channel port module comprising:

a fibre data interface, configured to couple to a high bandwidth link, for receiving byte striped fibre channel frames; and a backplane data interface coupled to said fibre data interface, adapted to couple to a plurality of low bandwidth links coupled to a plurality of ports on a switching element, for transmitting frame striped fibre channel frames over said plurality of low bandwidth links.

22. The fibre channel port module of claim 21 further comprising a front end coupled to said fibre data interface for receiving byte striped fibre channel frames, reassembling said byte striped fibre channel frames into complete fibre channel frames and transmitting the complete fibre channel frames to the backplane data interface.

* * * * *